US006761965B2

(12) United States Patent
Ferri et al.

(10) Patent No.: US 6,761,965 B2
(45) Date of Patent: *Jul. 13, 2004

(54) IRRADIATED MULTILAYER FILM HAVING SEAL LAYER CONTAINING HYPERBRANCHED POLYMER

(75) Inventors: Isabella Ferri, Bologna (IT); Slawomir Opuszko, Duncan, SC (US); Nathanael Rustia Miranda, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/106,013

(22) Filed: Mar. 25, 2002

(65) Prior Publication Data

US 2003/0087114 A1 May 8, 2003

Related U.S. Application Data

(60) Provisional application No. 60/333,285, filed on Nov. 6, 2001.

(51) Int. Cl.[7] .............................................. B32B 27/08
(52) U.S. Cl. ............. 428/220; 156/244.11; 156/244.24; 156/244.26; 156/273.3; 156/275.1; 156/308.4; 264/80; 264/173.12; 264/173.16; 264/469; 264/471; 264/473; 264/477; 428/35.4; 428/36.6; 428/36.7; 428/220; 428/516; 428/520; 428/522; 428/910
(58) Field of Search ............................. 428/35.4, 36.6, 428/36.7, 219, 220, 500, 515, 516, 520, 522, 910; 156/244.11, 244.24, 244.26, 273.3, 275.1, 308.4; 264/80, 173.12, 173.16, 469, 471, 473, 477

(56) References Cited

U.S. PATENT DOCUMENTS

| | | | |
|---|---|---|---|
| 3,613,874 A | 10/1971 | Miller | 206/46 |
| 4,064,296 A | 12/1977 | Bornstein et al. | 428/35 |
| 4,120,716 A | 10/1978 | Bonet | 156/272 |
| 4,879,430 A | 11/1989 | Hoffman | 428/35.1 |
| 5,089,320 A | 2/1992 | Straus et al. | 428/216 |
| 5,206,075 A | 4/1993 | Hodgson, Jr. | 428/216 |
| 5,241,031 A | 8/1993 | Mehta | 527/348.1 |
| 5,272,236 A | 12/1993 | Lai et al. | 526/348.5 |
| 5,278,272 A | 1/1994 | Lai et al. | 526/348.5 |
| 5,288,531 A | 2/1994 | Falla et al. | 428/35.2 |
| 5,397,613 A | 3/1995 | Georgelos | 428/36.7 |
| 5,447,772 A | 9/1995 | Flieger | 428/99 |
| 5,486,051 A | 1/1996 | May | 383/200 |
| 5,691,052 A | 11/1997 | Jones | 428/355 |
| 5,852,145 A | 12/1998 | McLain et al. | 526/133 |
| 5,866,663 A | 2/1999 | Brookhart et al. | 526/170 |
| 5,880,241 A | 3/1999 | Brookhart et al. | 526/348 |
| 5,882,749 A | 3/1999 | Jones et al. | 428/35.2 |
| 5,882,789 A | 3/1999 | Jones et al. | 428/349 |
| 5,942,579 A | 8/1999 | Falla et al. | 525/240 |
| 5,944,425 A | 8/1999 | Forman | 383/61 |
| 5,965,224 A | 10/1999 | Chen et al. | 428/352 |
| 5,993,962 A | 11/1999 | Timm et al. | 428/354 |
| 6,106,935 A | 8/2000 | Lambert et al. | 428/220 |
| 6,221,448 B1 | 4/2001 | Baetzold et al. | 428/35.2 |
| 6,248,442 B1 | 6/2001 | Kong et al. | 428/355 |
| 6,534,137 B1 | 3/2003 | Vadhar | 428/34.9 |
| 2003/0072957 A1 | 4/2003 | Lee et al. | 428/515 |
| 2003/0091763 A1 | 5/2003 | Ferri | 428/35.2 |

FOREIGN PATENT DOCUMENTS

| | | |
|---|---|---|
| EP | 0 801 096 A1 | 10/1997 |
| EP | 0 884 331 A2 | 12/1998 |
| JP | 11092521 | 4/1999 |
| JP | 11106424 | 4/1999 |
| WO | 90/03414 | 4/1990 |
| WO | 92/14784 | 9/1992 |
| WO | 93/03093 | 2/1993 |
| WO | 96/23010 | 8/1996 |
| WO | 98/03559 | 1/1998 |
| WO | 98/30609 | 7/1998 |
| WO | 98/40420 | 9/1998 |
| WO | 98/42664 | 10/1998 |
| WO | 98/42665 | 10/1998 |
| WO | 98/47933 | 10/1998 |
| WO | 99/05189 | 2/1999 |
| WO | 99/15569 | 4/1999 |
| WO | 99/32226 | 7/1999 |
| WO | 99/46302 | 9/1999 |
| WO | 99/46303 | 9/1999 |
| WO | 99/46304 | 9/1999 |
| WO | 00/06620 | 2/2000 |
| WO | 00/10945 | 3/2000 |

OTHER PUBLICATIONS

1990 Annual Book of ASTM Standards, vol. 08.02, pp 368–371, "Standard Test Method for Unrestrained Linear Thermal Shrinkage of Plastic Film and Sheeting".

"Linear Polymers with Hyperbranched Side Chains Via the "Hypergrafting" Strategy", Polymeric Materials: Science & Engineering 001, 84, 730—84, 731.

"Determination of Branching Distributions in Polyethylene and Ethylene Copolymers", Wild et al, pp 441–455.

(List continued on next page.)

Primary Examiner—D. S. Nakarani
(74) Attorney, Agent, or Firm—Rupert B. Hurley, Jr.

(57) ABSTRACT

An irradiated multilayer film has a first layer and a second layer. The first layer is an outer heat seal layer containing a blend of a highly branched homogeneous polymer and a semicrystalline polymer. The highly branched homogeneous polymer has at least 40 branches per 1000 methylene groups, an $M_w/M_n$ less than 3.0, and a density of less than 0.89 g/cc. The highly branched homogeneous polymer is present in an amount of from about 5 to 50 weight percent, based on layer weight. The semicrystalline polyolefin has a density of at least 0.90 g/cc. The semicrystalline polyolefin is present in an amount of from about 50 to 95 weight percent, based on total layer weight. The second layer contains a thermoplastic polymer in a crosslinked polymer network. A process for making a packaging article includes coextruding the first and second layers, irradiating the resulting multilayer film, and thereafter heat sealing the first layer to itself or another component of the packaging article.

13 Claims, No Drawings

OTHER PUBLICATIONS

"New Pc(II)– and Ni(II)–Based Catalysts for Polymerization of Ethylene and a–Olefins", Johnson et al, J. Am, Chem., Soc. 1995, 117, 6414–6415.

"Copolymerization of Ethylene and Propylene with Functionalized Vinyl Monomers by Palladium(II) Catalysts", Johnson et al, J. Am. Chem. Soc. 1996, 118, 267–268.

"Mechanistic Studies of the Palladium–Catalyzed Copolymerization of Ethylene and a–Olefins with Methyl Acrylate", Mecking et al, J. Am. Chem, Soc. 1998, 120, 888–899.

Living Polymerization of a–Olefins Using $Ni^{ii}$, J. Am. Chem. Soc. 1996, 118, 11664–11665.

"Branching Topography in Polyethylenes from a Chain Walking Catalyst", Cotts, DuPont CR&D, Abstract, Oct. 6, 2000.

"Chain Walking: A New Strategy to Control Polymer Topology", Guan et al, Science, vol. 283, Mar. 26, 1999, pp 2059–2062.

Macromolecules, American Chemical Society, 1999, vol. 32, No. 17, pp 5471–5476.

Scaling Concepts in Polymer Physics, Pierre–Gilles de Gennes, Cornell University Press, 1979, pp 19–21 and 219–241.

Viscoelastic Properties of Polymers, John D. Ferry, Third Edition, John Wiley & Sons, Inc., NY, NY, 1980, pp 232–233 and 385–387.

"Polymer Interfaces", Structure and Strength, Richard P. Wool, Hanser Publishers, NY, 1995, pp 1–20, 40–84, 85–90, 209–267, and 269–355.

IRRADIATED MULTILAYER FILM HAVING SEAL LAYER CONTAINING HYPERBRANCHED POLYMER

This application claims the benefit of provisional application no. 60/333,285 filed Nov. 6, 2001.

FIELD OF THE INVENTION

The present invention pertains to films which are to be heat sealed, especially flexible packaging films.

BACKGROUND OF THE INVENTION

Packaging films are frequently heat sealed in order that the film is converted to a packaging article, such as a bag, pouch, backseamed casing, etc. Irradiation of the polymer in the film, such as E-beam irradiation, crosslinks the polymer in the film, making it stronger. If the seal layer is irradiated, the crosslinking of the polymer can result in a seal layer which has diminished flow characteristics. However, if it is desired to irradiate other layers of the film, it may also be necessary to irradiate the seal layer. It would be desirable to provide a film which can be made stronger by irradiation, without substantially diminishing the heat seal performance of the seal layer.

SUMMARY OF THE INVENTION

The present invention is directed to an irradiated multilayer film having a seal layer containing a blend of a highly branched homogeneous polymer with a semicrystalline polymer. This blend can be irradiated without substantially diminishing the heat seal performance of the seal layer. The highly branched homogeneous polymer can be subjected to irradiation without resulting in a crosslinked structure which diminished the heat seal performance of the seal layer. The highly branched homogeneous polymer also prevents the semicrystalline polymer from crosslinking in a manner which substantially reduces heat seal performance.

As a first aspect, the present invention is directed to an irradiated multilayer film has a heat seal layer containing a blend of a highly branched homogeneous polymer and a semicrystalline polyolefin. The highly branched homogeneous polymer has at least 40 branches per 1000 methylene groups, has a $M_w/M_n$ less than 3.0, and a density of less than 0.89 g/cc. The highly branched homogeneous polymer is present in an amount of from about 5 to 50 weight percent (preferably, 20 to 40 weight percent) based on layer weight. The semicrystalline polyolefin has a density of at least 0.90 g/cc, and is present in an amount of from about 50 to 95 weight percent (preferably, from 60 to 80 weight percent), based on total layer weight. The second layer contains a crosslinked polymer network. Preferably, the heat seal has a seal strength at 75° C. of at least 100 grams per centimeter. The seal strength is preferably from 100 to 2000 grams per centimeter, more preferably from 200 to 1000 grams per centimeter. Preferably, the seal has a strength of at least 200 grams per centimeter.

Preferably, the semicrystalline polyolefin has a density of at least 0.905 g/cc, more preferably at least 0.91 g/cc, and can even have a density of at least 0.92 g/cc.

Preferably, the highly branched homogeneous polymer has from 40 to 120 branches per 1000 methylene groups, more preferably, from 40 to 90 branches per 1000 methylene groups, and still more preferably, from 45 to 80 branches per 1000 methylene groups.

Preferably, the semicrystalline polyolefin comprises at least one member selected from the group consisting of very low density polyethylene, linear low density polyethylene, low density polyethylene, high density polyethylene, propylene homopolymer, propylene copolymer, linear homogeneous ethylene/alpha-olefin copolymer, homogeneous ethylene/alpha-olefin copolymer having long chain branching. The semicrystalline polyolefin is different from the highly branched homogeneous polymer in that the semicrystalline polymer, if branched, has less than 60 branches per 1000 methylene groups. Preferably, the highly branched homogeneous polymer is a homopolymer of ethylene.

In one embodiment, the multilayer film comprises an oxygen barrier layer. Preferably, such a multilayer film further comprises a tie layer between the oxygen barrier layer and the seal layer. Preferably, the heat seal layer is an inside layer of the packaging article, and the tie layer between the oxygen barrier layer and the seal layer is a first tie layer, with the multilayer film further comprising a second tie layer between the oxygen barrier layer and an outside layer.

In one embodiment, the film is heat-shrinkable. Preferably, such a film has a total free shrink, at 185° F., of at least 20 percent; preferably, from 20 to 120 percent; more preferably, from 20 to 80 percent. In another embodiment, the multilayer film has a total free shrink, at 185° F., of less than 10 percent.

Preferably, the film has a thickness of from about 0.3–15 mils; more preferably, from 0.5 to 10 mils; or 1.5 to 6 mils, or 1.5 to 5 mils, or 1.5 to 4 mils, or 2 to 4 mils.

As a second aspect, the present invention is directed to a process for making a packaging article. The process comprises coextruding a multilayer film comprising a first layer which is a heat seal layer, and a second layer containing a thermoplastic polymer. After coextrusion of the first and second layers, the resulting multilayer film is irradiated to crosslink the thermoplastic polymer of the second layer. The heat seal layer is then sealed to itself or another component of the packaging article. The heat seal layer is in accordance with the first aspect of the present invention. Preferably, the heat seal has a seal strength of at least 75 grams per centimeter.

DETAILED DESCRIPTION OF THE INVENTION

The multilayer films of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce crosslinking between molecules of the irradiated material. The irradiation of polymeric films is disclosed in U.S. Pat. No. 4,064,296, to BORNSTEIN, et. A1., which is hereby incorporated in its entirety, by reference thereto. BORNSTEIN, et. A1. Discloses the use of ionizing radiation for crosslinking the polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16 to 166 kGy, more preferably about 40 to 90 kGy, and still more preferably, 55 to 75 kGy. Preferably, irradiation is carried out by an electron accelerator and the dosage level is determined by standard dosimetry processes.

Other accelerators such as a van der Graaf or resonating transformer may be used. The radiation is not limited to electrons from an accelerator since any ionizing radiation may be used.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. Although corona treatment is a preferred treatment of the multilayer films used to make the heat-sealed article and packaged product of the present invention, plasma treatment of the film may also be used.

Preparation of the highly branched homogeneous polymer (also sometimes referred to by those of skill in the art as a "hyperbranched homogeneous polymer") used in the present invention is described in U.S. Pat. No. 5,880,241, to Brookhart et al, entitled "Olefin Polymers", hereby incorporated in its entirety, by reference thereto. The polymers of Brookhart et al are disclosed as having a unique structure in terms of the branching in the polymer, with the number of branches, and to a certain extent the length of the branches, being determined by NMR spectroscopy. The amount of branching is expressed in terms of the number of branches per 1000 of the total methylene (—$CH_2$—) groups in the polymer, with one exception. Methylene groups that are in an ester grouping, i.e. —$CO_2$ R, are not counted as part of the 1000 methylenes. Otherwise, the methylene groups include those in the main chain and in the branches.

As used herein, the phrase "highly branched homogeneous polymer" (i.e., "HBH polymer") refers to single site catalyzed resin with a polymer architecture wherein there are at least 40 side branches from the main chain for every 1000 main chain carbons. While not wishing to be restricted to any single sub-architecture, it is possible that some of the side branches may themselves contain side branches, similar to dendritic, or "tree-like" structures. It is believed from observations of the performance of these highly branched homogeneous polymers, that the number and type of branching results in a macro-structure which assumes a somewhat spherical conformation. This substantially spherical topology of the polymer chain is believed to be responsible for unique flow properties, as a consequence of interaction with other polymer chains.

The HBH polymer useful in the present invention have greater than 40 side chain branches per 1000 carbon atoms, preferably at least 50 side chain branches per 1000 carbon atoms; preferably from about 60 to 140 side chain branches per 1000 carbon atoms. For every 100 side chain branches that are methyl, the HBH polymer has 1 to about 80 ethyl branches, 1 to about 20 propyl branches, 1 to about 50 butyl branches, 1 to about 20 amyl branches, and 1 to about 100 hexyl or longer branches.

More preferably, the HBH polyolefins useful in the present invention have from about 40 to 110 side chain branches per 1000 carbon atoms. For every methyl 100 side chain branches, preferably there are from 1 to about 20 ethyl branches, from 1 to about 10 propyl branches, from 1 to about 15 butyl branches, from 1 to about 10 amyl branches, and from 1 to about 30 hexyl or longer branches.

More preferably, the HBH polymer useful in the present invention have from about 50 to 100 side chain branches per 1000 carbon atoms. For every 100 branches that are methyl, preferably there are from about 2 to about 18 ethyl branches, from about 2 to about 8 propyl branches, from about 2 to about 12 butyl branches, from 2 to about 8 amyl branches, and from about 8 to about 30 hexyl or longer branches.

The HBH polymer is preferably a narrow molecular weight (Mw/Mn), single site catalyzed resins. The HBH polymer preferably has a molecular weight distribution less than 3, preferably less than 2.5. However, it is possible to prepare HBH polymer having greater Mw/Mn using tandem reactor processes which can result in bimodal or multimodal products comprising the HBH polyolefins.

The HBH polymer exhibits a melt index of from about 0.5 to about 10 g/10 min, preferably from about 1 to 9, more preferably from about 1.1 to 8.5, more preferably from about 1.5 to about 7.5. The HBH polyethylene useful in the present invention has a molecular weight (Mw) of from about 80,000 to about 200,000, preferably from about 90,000 to about 150,000. The HBH polymer may be prepared by methods of synthesis disclosed herein, preferably using nickel (II) α-diimine catalyst complexes. Other methods of preparing HBH polyolefin include methods disclosed in U.S. Pat. No. 5,866,663 to Brookhart et al. entitled "Process of Polymerizing Olefins", hereby incorporated in its entirety, by reference thereto.

The HBH polymer useful in the present invention can alternatively be evaluated via proton NMR or $^{13}$C NMR. Structural assignments for the polymers of the invention were determined by $^{13}$C NMR. Methodology and instrumental conditions used were in accord with ASTM method D-5017-96. Approximately 150 mg of polymer sample, 2 ml 1,2,4-trichlorobenzene, 0.75 ml of benzene-d6 (external lock), and 0.25 ml of hexamethyldisiloxane (internal reference) were loaded into a 10 mm NMR sample tube. The contents of the sample tube were homogenized using a heating block at 130° C. for 3-4 hours. NMR data were collected at 130° C. using a Bruker DMX-400 instrument ($^{13}$C resonance at 50.3 MHz). The pulse width was 90° as measured using the resonance of the isolated methylenes at 30.0 ppm. 3000 scans were collected for each specimen (at least 32,000 data points) at a 150 ppm sweep width. The pulse repetition rate used was 10 seconds with complete proton decoupling. All $^{13}$C-NMR signals from 50-10 ppm were integrated. Total side chain branching was calculated from integral ratios of methyl groups at branch ends to total polymeric $^{13}$C-NMR signal (methyls per 1000 carbon atoms). Branch distribution was calculated from integral ratios of specific branch length (type) resonances. Signals from side branches of six carbons and longer are unresolved and are therefore integrated as one composite signal (C6+).

HBH polyolefin has at least 50 branches per 1000 carbon atoms, preferably at least 60 branches per 1000 carbon atoms, in which at least 50 percent of the branches are methyl, from 2 to about 25 percent of the branches are ethyl, from 1 to about 20 percent of the branches are propyl, and from 1 to about 20 percent of the branches are butyl, and from 1 to about 20 percent of the branches are amyl, and from about 5 to about 50 percent of the branches are hexyl or longer. Preferably, the HBH polymer has at least 60 branches per 1000 carbon atoms, in which at least 60 to about 80 percent of the branches are methyl, from about 4 to about 20 percent of the branches are ethyl, from about 2 to about 15 percent of the branches are propyl, and from about 2 to about 20 percent of the branches are butyl, and from about 2 to about 15 percent of the branches are amyl, and from about 5 to about 30 percent of the branches are hexyl or longer.

More preferably, the HBH polyolefin has at least 70 branches per 1000 carbon atoms, in which at least 70 percent of the branches are methyl, from about 2 to about 10 percent of the branches are ethyl, from about 2 to about 10 percent of the branches are propyl, and from about 2 to about 10 percent of the branches are butyl, and from about 2 to about 10 percent of the branches are amyl, and from about 7 to about 20 percent of the branches are hexyl or longer.

Preferably, the HBH polymer in the film of the invention is a HBH polyolefin, preferably a HBH polyethylene. In one preferred embodiment, at least one outer layer of the film contains one or more HBH polyethylene, which may make up 100 percent of the weight of the film layer. Alternatively, the HBH polymer is blended with one or more additional polymers and/or additives (such a slip agents, antiblock agents, etc). If another polymer is present, the HBH polymer preferably comprises at least 20% of the weight of the layer. Preferably, the HBH polyolefin comprises about 30% by weight of the blend. More preferably, the HBH polyolefin comprises about 40% by weight of the blend. Preferred ranges for resin blends comprising the HBH polyolefin are in the range of from about 10 percent to about 90 percent, preferably about 20 to about 80 percent, preferably from about 30 percent to about 75 percent, still more preferably from about 40 to 70 percent of the HBH polyolefin. The optimal amount of HBH polyolefin in the layer depends upon the degree of branching present in the HBH polymer or polymers, as well as on the nature of any other polymeric component and/or additive in the layer.

It has been found that the HBH polyolefin utilized in the films of the present invention is also capable of forming a hermetic heat seal with other polymers, such as, for example, linear low density polyethylene (LLDPE), very low density polyethylene (VLDPE), ethylene/vinyl acetate copolymer (EVA), ionomer, and to a lesser extent, nylon, polystyrene, and polyethylene terephthalate.

The second polymer is inclusive of non-highly branched homogeneous copolymers, as well as highly branched homogeneous polymers having a branching level of less than 40 branches per 1,000 carbon atoms.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around (i.e., enveloping) a product being packaged. The phrase "packaged product," as used herein, refers to the combination of a product which is surrounded by a packaging material.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die. Moreover, an outside layer has an "inside surface" and an "outside surface," the inside surface being that surface of the outside layer which is adhered to another film layer, and the outside surface of the outside layer being that surface which is not adhered to another film layer.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the phrases "heat-shrinkable," "heat-shrink" and the like refer to the tendency of a film, generally an oriented film, to shrink upon the application of heat, i.e., to contract upon being heated, such that the size (area) of the film decreases while the film is in an unrestrained state decreases. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained).

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards,* Vol. 08.02, pp. 368–371, which is hereby incorporated, in its entirety, by reference thereto. Preferably, the heat shrinkable film has a total free shrink (i.e., machine direction plus transverse direction), as measured by ASTM D 2732, of at least as 5 percent at 185° C., more preferably at least 7 percent, still more preferably, at least 10 percent, and, yet still more preferably, at least 20 percent, 30 percent, 40 percent, 50 percent, 60 percent, 70 percent, and even at least 80 percent.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the term "seal" refers to any seal of a first region of an outer film surface to a second region of an outer film surface, including heat seals as well as adhesive bonding. In contrast, the term "heat seal" refers to seals made by heating one or more polymeric components in one or more films at least to their respective seal initiation temperatures so that a bond is made upon resolidification of the flowing polymer. Sealing can be performed by any one or more of a wide variety of manners, such as using a heat seal technique (e.g., melt-bead sealing, thermal sealing, impulse sealing, dielectric sealing, radio frequency sealing, ultrasonic sealing, hot air, hot wire, infrared radiation, etc.).

A preferred sealing method is impulse heat sealing utilizing seal wire of a material known as Toss Alloy 20, obtained from Toss Machine Components of Nazareth, Pa. A preferred seal wire is 6 millimeters wide and 0.15 millimeters thick, presenting a flat surface to the film, but having tapered edges. In making the seal, the total dwell time is about 2 seconds, with the pressure being about 500 pounds across each of the approximately 23 inch long sealing length.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin (e.g., linear low density polyethylene, very low density polyethylene, homogeneous polymers such as metallocene catalyzed ethylene/alpha-olefin copolymer, etc), polyamide, polyester (e.g., polyethylene terephthalate glycol), ethylene/ester copolymer (e.g., ethylene/vinyl acetate copolymer), ionomer, etc.

As used herein, the term "bag" is inclusive of L-seal bags, side-seal bags, end-seal bags, backseamed bags, and pouches. An L-seal bag has an open top, a bottom seal, a seal along a first side edge, and a seamless (i.e., folded, unsealed) second side edge. A side-seal bag has an open top, a seamless bottom edge, with each of its two side edges having a seal therealong. An end-seal bag is made from a seamless tubing and has an open top, a bottom seal, and seamless side edges. A pouch has an open top and a bottom seal and a seal along each side edge. Although seals along the side and/or bottom edges can be at the very edge itself, (i.e., seals of a type commonly referred to as "trim seals"), preferably the seals are spaced inward (preferably ¼ to ½ inch, more or less) from the bag side edges, and preferably are made using impulse-type heat sealing apparatus, which utilizes a bar which is quickly heated and then quickly cooled. A backseamed bag is a bag having an open top, a seal running the length of the bag in which the bag film is either fin-sealed or lap-sealed, two seamless side edges, and a bottom seal along a bottom edge of the bag.

As used herein, the phrase "heterogeneous polymer" refers to polymerization reaction products of relatively wide variation in molecular weight ($M_w/M_n$ greater than 3.0) and relatively wide variation in composition distribution, i.e., typical polymers prepared, for example, using conventional Ziegler-Natta catalysts. Heterogeneous copolymers typically contain a relatively wide variety of chain lengths and comonomer percentages.

As used herein, the phrase "homogeneous polymer" refers to polymerization reaction products of relatively narrow molecular weight distribution ($M_w/M_n$ less than 3.0) and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more processes known to those of skill in the art, such as molecular weight distribution (Mw/Mn), Mz/Mn, composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., J. Poly. Sci. Poly. Phys. Ed., Vol. 20, p.441 (1982). Preferably, homogeneous ethylene/alpha-olefin copolymers have a CDBI greater than about 70%, i.e., a CDBI of from about 70% to 99%. A homogeneous ethylene/alpha-olefin copolymer can, in general, be prepared by the copolymerization of ethylene and any one or more alpha-olefin. Preferably, the alpha-olefin is a $C_3-C_{20}$ alpha-monoolefin, more preferably, a $C_4-C_{12}$ alpha-monoolefin, still more preferably, a $C_4-C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties. Each of these patents disclose substantially linear homogeneous long chain branched ethylene/alpha-olefin copolymers produced and marketed by The Dow Chemical Company.

As used herein, the phrase "ethylene/alpha-olefin copolymer", and "ethylene/alpha-olefin copolymer", refer to such heterogeneous copolymers as linear low density polyethylene (LLDPE), and very low and ultra low density polyethylene (VLDPE and ULDPE); and homogeneous polymers such as metallocene catalyzed polymers such as EXACT® resins obtainable from the Exxon Chemical Company, and TAFMER® resins obtainable from the Mitsui Petrochemical Corporation. All these materials generally include copolymers of ethylene with one or more comonomers selected from $C_4$ to $C_{10}$ alpha-olefin such as butene-1, hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefins commonly known as LLDPE have a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene/alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

Preferably, the film according to the present invention comprises a total of from 2 to 20 layers; more preferably, from 2 to 12 layers; more preferably, from 2 to 9 layers; more preferably, from 3 to 8 layers. Various combinations of layers can be used in the formation of a multilayer film according to the present invention. Given below are some examples of preferred multilayer film structures in which letters are used to represent film layers (although only 2- through 5-layer embodiments are provided here for illustrative purposes, further layers could be present):

A/B,
A/C,
A/B/A,
A/B/B',
A/B/C,
A/B/C/B,
A/B/C/B',
A/B/C/B/A,
B/A/C/B/A'
wherein
A represents a layer that includes the blend of the highly branched homogeneous polymer and the semicrystalline polymer, particularly a semicrystalline ethylene/alpha-olefin copolymer;
B represents a layer including at least one member selected from the group consisting of polyolefin (particularly an ethylene/alpha-olefin copolymer), polyester (including polycarbonate), polyamide, polyaromatic (particularly polystyrene and poly(phenol-formaldehyde), and poly(amine-formaldehyde)), polyether, polyimide, polyimine, polyurethane, polysulfone, polyalkyne; and
C represents a layer including a polymer serving as an oxygen barrier layer, e.g., polyvinylidene chloride "PVDC" (PVDC homopolymer and/or methyl acrylate copolymer "PVDC-MA" and/or vinyl chloride copolymer "PVDC-VC"), ethylene/vinyl alcohol copolymer ("EVOH"), polyamide, etc.

Of course, one or more tie layers ("T") can be used between any one or more layers of in any of the above multilayer film structures. Also, while "A" represents the above-described blend, "A'" is a different blend from the A blend, and so on. A film having two "B" layers (as opposed to B and B') could have the same B polymer(s) or different B polymer(s), in the same or different amounts and/or ratios with respect to one another and with respect to the multilayer film as a whole.

As used herein, the phrase "packaging article" is used with reference to bags, pouches, casings, etc. which are useful for the packaging of products.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride ("PVDC"), especially PVDC-methyl acrylate copolymer ("PVDC-MA"), and PVDC-vinyl chloride copolymer ("PVDC-VC"), as well as polyamide, polyester, polyalkylene carbonate, polyacrylonitrile, etc., as known to those of skill in the art.

Regardless of the structure of the multilayer film of the present invention, one or more conventional packaging film additives can be included therein. Examples of additives that can be incorporated include, but are not limited to, anti-blocking agents, antifogging agents, slip agents, colorants, flavorings, antimicrobial agents, meat preservatives, and the like. Where the multilayer film is to be processed at high speeds, inclusion of one or more antiblocking agents in and/or on one or both outer layers of the film structure can be preferred. Examples of useful antiblocking agents for certain applications are corn starch and ceramic microspheres.

As is known to those of skill in the art, various polymer modifiers may be incorporated for the purpose of improving toughness and/or orientability or extensibility of the film. Other modifiers which may be added include: modifiers which improve low temperature toughness or impact strength, and modifiers which reduce modulus or stiffness. Exemplary modifiers include: styrene-butadiene, styrene-isoprene, and ethylene-propylene.

The films of the present invention can be produced using a hot blown process in which the film is extruded through an annular die and immediately blown by a blown bubble, while the polymer is at or near its melt temperature. Such films exhibit a total (i.e., longitudinal plus transverse) free shrink at 185 F. of less than 10 percent, generally no more than 5 percent in either direction. Such hot blown films are not considered to be heat-shrinkable films because the amount of heat-shrinkability is not high enough to provide the shrink character typically required of heat-shrinkable films. Although hot blown films are oriented, the orientation occurs in the molten state, without producing the orientation-induced stress which renders the film heat-shrinkable.

On the other hand, films of the present invention can also be produced using a cast process. The film can be cast from a slot die with the extrudate being quenched by immediately contacting a chilled roll to cause solidification and cooling, followed by being reheated to a temperature below the melt point (preferably to the softening point of the polymer), followed by solid-state orientation using a tenter frame. Alternatively, the film can be formed by downward casting from an annular die, with the resulting annular "tape" being quenched using cascading water, cooled air (or other gas), or even ambient air. The resulting solidified and cooled annular tape is then reheated to a desired orientation temperature and oriented while in the solid state, using a trapped bubble.

Films which are oriented in the solid state are considered to be heat-shrinkable, as they have a total free shrink (L+T) at 185° F. of greater than 10 percent. Often the quenched extrudate is irradiated before being reheated to the softening temperature of the polymer, i.e., immediately before the solid-state orientation. The extrudate can even be subjected to extrusion coating before reheating. Generally extrusion coating is carried out after irradiation, to provide a stronger substrate which is extrusion coated with a polymer sensitive to irradiation, such as PVDC, which is degraded by irradiation. In this manner, the substrate can be strengthened by irradiative crosslinking in order to permit a greater degree of solid-state orientation, or simply to enhance bubble stability during solid-state orientation.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. An irradiated multilayer film comprising a first layer and a second layer, the first layer being an outer heat seal layer containing a blend of (A) a highly branched homogeneous polymer having at least 40 branches per 1000 methylene groups, the highly branched polymer having an $M_w/M_n$ less than 3.0, a density of less than 0.89 g/cc, the highly branched homogeneous polymer being present in an amount of from about 5 to 50 weight percent, based on layer weight, and (B) a semicrystalline polyolefin having a density of at least 0.90 g/cc, the semicrystalline polyolefin being present in an amount of from about 50 to 95 weight percent, based on total layer weight, the second layer containing a thermoplastic polymer in a crosslinked polymer network.

2. The packaging article according to claim 1, wherein the semicrystalline polyolefin has a density of at least 0.905 g/cc.

3. The packaging article according to claim 1, wherein the highly branched homogeneous polymer has from 40 to 120 branches per 1000 methylene groups.

4. The packaging article according to claim 1, wherein the semicrystalline polyolefin comprises at least one member selected from the group consisting of very low density polyethylene, linear low density polyethylene, low density polyethylene, high density polyethylene, propylene homopolymer, propylene copolymer, linear homogeneous ethylene/alpha-olefin copolymer, homogeneous ethylene/alpha-olefin copolymer having long chain branching.

5. The packaging article according to claim 1, wherein the highly branched homogeneous polymer comprises ethylene homopolymer.

6. The packaging article according to claim 1, wherein the multilayer film comprises an oxygen barrier layer.

7. The packaging article according to claim 6, wherein the multilayer film further comprises a tie layer between the oxygen barrier layer and the seal layer.

8. The packaging article according to claim 7, wherein the heat seal layer is an inside layer of the packaging article, and the tie layer between the oxygen barrier layer and the seal layer is a first tie layer, the multilayer film further comprising a second tie layer between the oxygen barrier layer and an outside layer.

9. The film according to claim 1, wherein the film is heat-shrinkable.

10. The film according to claim 9, wherein the film has a total free shrink, at 185° F., of at least 20 percent.

11. The multilayer film according to claim 1, wherein the film has a total free shrink, at 185° F., of less than 10 percent.

12. The film according to claim 1, wherein the film has a thickness of from about 0.3–15 mils.

13. A process for making a packaging article, comprising:
   (A) extruding a multilayer film having:
      (i) a first layer which is an outer layer comprising containing a blend of (A) a highly branched homogeneous polymer having at least 40 branches per 1000 methylene groups, said polymer having an $M_w/M_n$ less than 3.0, a density of less than 0.89 g/cc, the highly branched homogeneous polymer being present in an amount of from about 5 to 50 weight percent, based on layer weight, and (B) a semicrystalline polyolefin having a density of at least 0.90 g/cc, the semicrystalline polyolefin being present in an amount of from about 50 to 95 weight percent, based on total layer weight; and
      (ii) a second layer containing a thermoplastic polymer; and
   (B) irradiating the multilayer film so that the second layer comprises a crosslinked polymer network; and
   (C) heat sealing the seal layer to itself or another component of the packaging article.

* * * * *